United States Patent
Ogawa et al.

(10) Patent No.: US 12,077,030 B2
(45) Date of Patent: Sep. 3, 2024

(54) CONTROL DEVICE, VEHICLE, AND CONTROL METHOD

(71) Applicant: TOYOTA JIDOSHA KABUSHIKI KAISHA, Toyota (JP)

(72) Inventors: Toshinari Ogawa, Nagoya (JP); Kohta Tarao, Nagoya (JP); Shinya Kijima, Nagoya (JP); Osamu Fukawatase, Miyoshi (JP); Koji Yasui, Toyota (JP); Toshiyuki Kobayashi, Miyoshi (JP); Hitomi Nakatani, Toyota (JP); Kuniaki Jinnai, Nagoya (JP); Nobuki Hayashi, Nisshin (JP); Masahiro Nagano, Toyota (JP); Akihiro Ito, Shinagawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/506,272

(22) Filed: Nov. 10, 2023

(65) Prior Publication Data
US 2024/0075789 A1 Mar. 7, 2024

Related U.S. Application Data

(63) Continuation of application No. 17/247,124, filed on Dec. 1, 2020, now Pat. No. 11,850,910.

(30) Foreign Application Priority Data

Dec. 19, 2019 (JP) ................. 2019-229276

(51) Int. Cl.
*B60H 1/00* (2006.01)
*B60H 1/04* (2006.01)
(Continued)

(52) U.S. Cl.
CPC .......... *B60H 1/00392* (2013.01); *B60H 1/04* (2013.01); *B60K 1/00* (2013.01); *B60K 11/02* (2013.01);
(Continued)

(58) Field of Classification Search
None
See application file for complete search history.

(56) References Cited

U.S. PATENT DOCUMENTS 6,516,925 B1 2/2003 Napier
7,040,430 B2 5/2006 Nomura
(Continued)

FOREIGN PATENT DOCUMENTS

JP 2003-317787 A 11/2003
JP 2019-26111 A 2/2019
(Continued)

*Primary Examiner* — Jenna M Maroney
(74) *Attorney, Agent, or Firm* — Oblon, McClelland, Maier & Neustadt, L.L.P.

(57) ABSTRACT

A control device includes a controller that executes determining a connection between a first unit that has a boarding space which allows a user to board and is provided with a predetermined facility and that is provided with a first path through which a fluid used in the predetermined facility passes and a second unit that is configured to be separated from and connected to the first unit and that has a drive device of a vehicle that is formed by being connected to the first unit, and supplying the fluid in the first path to a second unit side to absorb heat generated from the drive device.

10 Claims, 5 Drawing Sheets

(51) Int. Cl.
*B60K 1/00* (2006.01)
*B60K 11/02* (2006.01)
*B60R 16/08* (2006.01)

(52) U.S. Cl.
CPC .... *B60R 16/08* (2013.01); *B60H 2001/00307* (2013.01); *B60K 2001/005* (2013.01)

(56) References Cited

U.S. PATENT DOCUMENTS

| | | |
|---|---|---|
| 7,109,601 B2 | 9/2006 | Costello |
| 7,213,664 B2 | 5/2007 | Nomura |
| 9,758,010 B2 | 9/2017 | Johnston |
| 2003/0155160 A1 | 8/2003 | Nomura |
| 2006/0144625 A1 | 7/2006 | Nomura |
| 2010/0096203 A1 | 4/2010 | Freese, V |
| 2012/0167929 A1 | 7/2012 | Benfield |
| 2013/0241236 A1 | 9/2013 | Vitale |
| 2019/0241040 A1 | 8/2019 | Errick |
| 2020/0207419 A1 | 7/2020 | Iwasaki |
| 2021/0163083 A1 | 6/2021 | Ogawa |
| 2021/0261163 A1 | 8/2021 | Ohno |
| 2021/0303000 A1 | 9/2021 | Ogawa |
| 2022/0055653 A1 | 2/2022 | Ogawa |

FOREIGN PATENT DOCUMENTS

| | | | | |
|---|---|---|---|---|
| WO | WO-2016099257 A1 * | 6/2016 | ............ | A01B 59/00 |
| WO | WO 2018/230720 A1 | 12/2018 | | |

\* cited by examiner

CONTROL DEVICE, VEHICLE, AND CONTROL METHOD

CROSS REFERENCE TO RELATED PATENT APPLICATIONS

This application is a Continuation of U.S. patent application Ser. No. 17/247,124, filed Dec. 1, 2020, which claims priority of Japanese Patent Application No. 2019-229276 filed on Dec. 19, 2019. The contents of the above-identified applications are incorporated herein by reference in their entirety.

BACKGROUND

1. Technical Field

The present disclosure relates to a control device, a vehicle, and a control method.

2. Description of Related Art

An autonomous driving vehicle including a traveling unit having no vehicle cabin and a structure detachably attached to the upper portion of the traveling unit is disclosed (for example, WO 2018/230720).

SUMMARY

One aspect of the disclosure is to provide a technique to accelerate heat dissipation from heat generated by a drive device in a vehicle in which a vehicle cabin unit and a traveling unit equipped with drive wheels and the drive device that drives the drive wheels are separable and connectable.

A first aspect of the present disclosure relates to a control device. The control device includes a controller that executes determining a connection between a first unit that has a boarding space which allows a user to board and is provided with a predetermined facility and that is provided with a first path through which a fluid used in the predetermined facility passes and a second unit that is configured to be separated from and connected to the first unit and that has a drive device of a vehicle that is formed by being connected to the first unit, and supplying the fluid in the first path to a second unit side to absorb heat generated from the drive device.

A second aspect of the present disclosure relates to a vehicle. The vehicle includes a first unit that has a boarding space which allows a user to board and is provided with a predetermined facility and that is provided with a first path through which a fluid used in the predetermined facility passes, a second unit that is configured to be separated from and connected to the first unit and that has a drive device of a vehicle that is formed by being connected to the first unit, a connection member that connects the first unit and the second unit, and a first controller that executes supplying the fluid in the first path to a second unit side to absorb heat generated from the drive device in a case where the first unit and the second unit are connected by the connection member.

A third aspect of the present disclosure relates to a control method. The control method includes a determination step of determining a connection between a first unit that has a boarding space which allows a user to board and is provided with a predetermined facility and that is provided with a first path through which a fluid used in the predetermined facility passes and a second unit that is configured to be separated from and connected to the first unit and that has a drive device of a vehicle that is formed by being connected to the first unit, and a supply step of supplying the fluid in the first path to a second unit side to absorb heat generated from the drive device.

According to the present disclosure, it is possible to provide the technique to accelerate the heat dissipation from the heat generated by the drive device in the vehicle in which the vehicle cabin unit and the traveling unit equipped with the drive wheels and the drive device that drives the drive wheels are separable and connectable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A predetermined facility according to a first aspect of the present disclosure includes a water heater and an air conditioner. A fluid according to the first aspect of the present disclosure includes clean water used in the air conditioner, a heating medium that exchanges heat with air supplied from the air conditioner, and wastewater generated in a first unit. A drive device included in a second unit includes a motor that drives drive wheels of a vehicle formed by connecting the second unit and the first unit. The drive device includes a secondary battery that supplies electric power to the motor.

With the control device as described above, the fluid in the first unit is used without providing a heat dissipation device in the second unit, and thus it is possible to accelerate heat dissipation of the drive device provided in the second unit. That is, such a control device can accelerate the heat dissipation of the second unit while suppressing an unnecessarily increase in size of the second unit that is separable and connectable with the first unit that allows a user to board.

First Embodiment

Configuration of Vehicle 1

Figure 1:
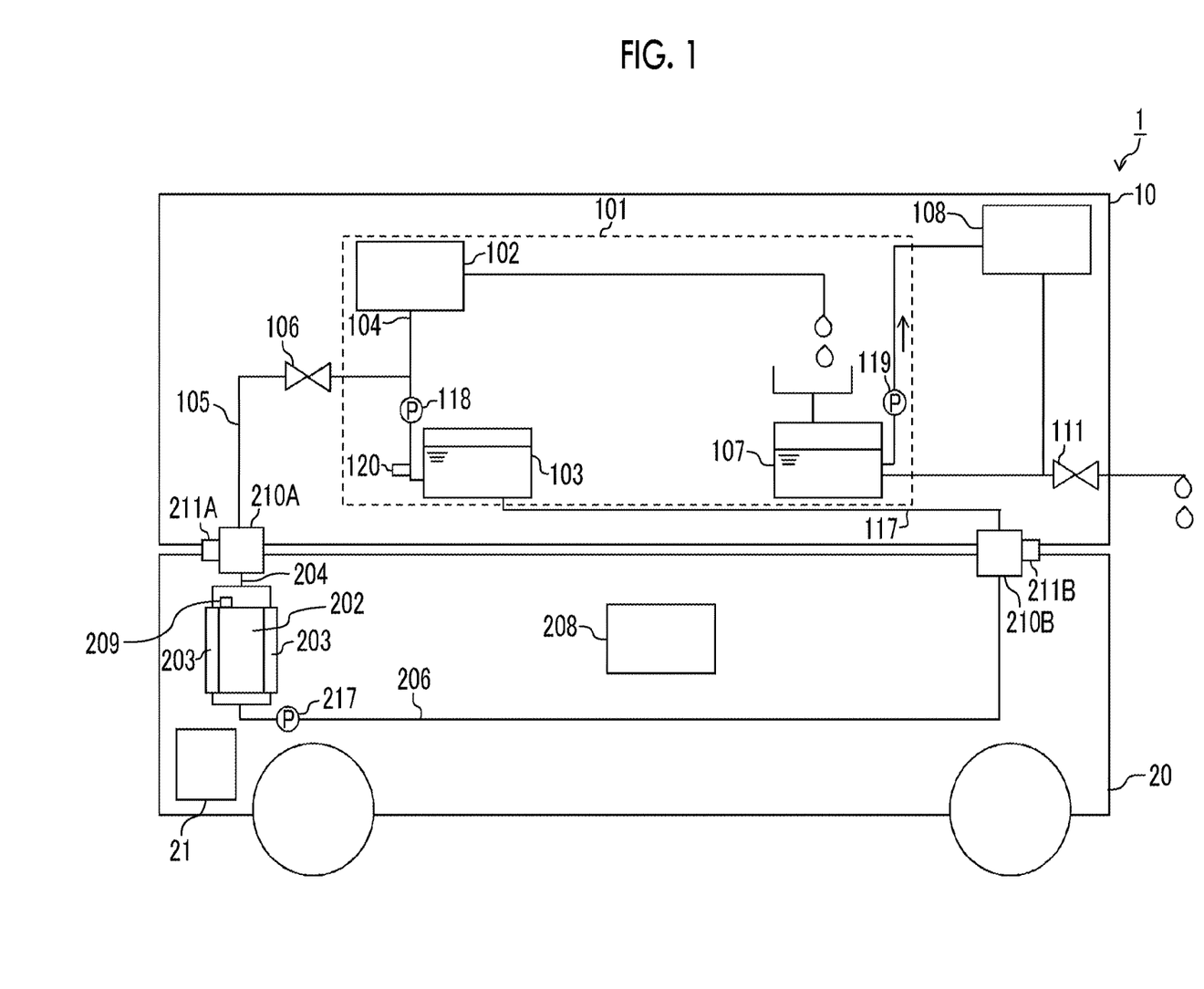
FIG. 1 shows an example of an outline of a vehicle according to a first embodiment.

FIG. 1 shows an example of an outline of a vehicle 1 according to a first embodiment. The vehicle 1 is, for example, an electric vehicle, and includes a vehicle cabin unit 10 that has a space allowing the user to board and a traveling unit 20 that is capable of autonomous traveling. The vehicle cabin unit 10 and the traveling unit 20 can be separated and connected vertically. The vehicle cabin unit 10 and the traveling unit 20 may be respectively provided with, for example, a mechanism that is separable and connectable to achieve the separation and the connection. The vehicle cabin unit 10 and the traveling unit 20 may be separated and connected by using the magnetic force of an electromagnet, for example. The vehicle cabin unit 10 is an example of the "first unit" of the present disclosure. The traveling unit 20 is an example of the "second unit" of the present disclosure. In the following embodiments, various sensors provided in the vehicle 1 include communication modules capable of wireless communication and wirelessly transmit measurement data to a control device 21 (described below) provided in the traveling unit 20. Each pump provided in the vehicle 1 includes a communication module capable of wireless communication, wirelessly receives an operation control signal from the control device 21, and operates according to the received operation control signal. Each valve provided in the vehicle 1 includes a communication module capable of wireless communication, wirelessly receives an opening-degree control signal from the control device 21, and is opened and closed according to the received opening-degree control signal.

Configuration of Vehicle Cabin Unit 10

The vehicle cabin unit 10 has the space that allows the user to board, and a kitchen unit 101 is provided in the space. The kitchen unit 101 is provided with a water heater 102 and a clean water tank 103 that stores clean water. The kitchen unit 101 is provided with a pipe 104 that connects the clean water tank 103 and the water heater 102. A pump 118 for pumping the clean water from the clean water tank 103 to the water heater 102 is provided in the middle of the pipe 104. The pipe 104 is branched in the middle, and a branched pipe 105 is provided such that a tip opening of the branched pipe is connectable with a pipe provided in the traveling unit 20. A valve 106 is provided in the middle of the pipe 105. An opening degree of the valve 106 is controlled to adjust a flow rate of the clean water flowing from the pipe 104 to the pipe 105. A pipe 104 near an outlet of the clean water tank 103 is provided with a temperature sensor 120 capable of measuring the temperature of the clean water passing through the pipe 104. The pipe 104 is an example of a "first path" in the present disclosure.

The kitchen unit 101 includes a sink in which hot water generated in the water heater 102 is used, and a wastewater tank 107 below the sink. The hot water that is used for a predetermined purpose in the sink flows into the wastewater tank 107 as the wastewater and is stored.

The vehicle cabin unit 10 includes an air conditioner 108, a circulation pipe that circulates between the wastewater tank 107 and the air conditioner 108, and a pump 119 that pumps the wastewater from the wastewater tank 107 to the air conditioner 108. When the wastewater stored in the wastewater tank 107 (an example of the heating medium of the present disclosure) passes through the circulation pipe and is supplied to the air conditioner 108, the wastewater exchanges heat with the air passing through the outer surface of the circulation pipe and thus the air is heated in the air conditioner 108. The air further exchanges the heat with a predetermined heating medium, is further heated, and is supplied to the inside of the vehicle cabin unit 10 as warm air.

The circulation pipe from the air conditioner 108 to the wastewater tank 107 is branched before the wastewater tank 107, and water is discharged from the branched pipe to the outside of the system. A valve 111 is provided in the middle of the branched pipe. The opening degree of the valve 111 is controlled to adjust the flow rate of the water discharged to the system out of the water flowing through the circulation pipe connecting the wastewater tank 107 and the air conditioner 108. The valve 111 may be opened, for example, while the vehicle 1 is stopped.

The vehicle cabin unit 10 includes a pipe 117. The pipe 117 connects the pipe provided in the traveling unit 20 and the clean water tank 103.

Configuration of Traveling Unit 20

The traveling unit 20 includes the control device 21. The control device 21 is provided with an electronic control unit (ECU) having a central processing unit (CPU) and a memory. The control device 21 includes a communication module capable of wireless communication with an external device, an external storage device, and a Global Positioning System (GPS) module.

The traveling unit 20 includes a drive motor 202. The drive motor 202 rotates each wheel provided in the traveling unit 20. Note that the drive motor 202 may drive any one pair of two pairs of front and rear wheels. The traveling unit 20 includes a steering motor. The steering motor outputs power for changing a direction along a rotation shaft of at least a pair of wheels to steer the vehicle 1. The traveling unit 20 includes an encoder that can detect a rotation angle and a steering angle of the wheels. The traveling unit 20 includes an environment sensor that can detect the environment around the vehicle 1. The environment sensor, for example, emits an ultrasonic wave, an electromagnetic wave, or the like in a detection target direction, and detects presence, position, relative speed, and the like of an obstacle in the detection target direction by using a difference between the emitted wave and the received reflected wave. Examples of the obstacles include a pedestrian, a bicycle, a structure, and a building. The environment sensor may include, for example, a microphone, and may detect presence of a surrounding person by analyzing a frequency spectrum of a signal output from the microphone, by voice recognition, or the like.

The control device 21 acquires information on a current point by the GPS module and generates a route to a target point. The drive motor 202 and the steering motor are controlled such that the vehicle 1 moves along the generated route. In a case where the drive motor 202 and the steering motor are controlled, the information on the wheel rotation angle and the steering angle detected by the encoder is used. The control device 21 acquires obstacle information by the environment sensor, and the initially generated route is modified to avoid the obstacle. Through such processing, the traveling unit 20 can autonomously travel from the current point to the target point.

The traveling unit 20 is provided with a jacket 203 that covers an outer surface of the drive motor 202. The inside of the jacket 203 has a structure through which water can pass. The water passing through the inside of the jacket 203 absorbs heat generated from the drive motor 202 and cools the drive motor 202. The traveling unit 20 is provided with a pipe 204 that is connected to an inlet of the jacket 203 and allows the water to flow into the jacket 203. The pipe 204 is provided such that a tip opening of the pipe is connectable with the tip opening of the pipe 105 provided in the vehicle cabin unit 10. The traveling unit 20 is provided with a pipe 206 that is connected to an outlet of the jacket 203 and through which the water passing through the jacket 203 passes. The pipe 206 is provided such that a tip opening of the pipe is connectable with a tip opening of the pipe 117 provided in the vehicle cabin unit 10. The pipe 206 is provided with a pump 217 that pumps the water from the jacket 203 to the pipe 117 provided in the vehicle cabin unit 10. The traveling unit 20 includes a temperature sensor 209 near the drive motor 202 that measures a temperature near the drive motor 202. The traveling unit 20 includes a battery 208. The battery 208 supplies the electric power to the drive motor 202.

The traveling unit 20 includes a connection member 210A that connects the tip opening of the pipe 204 and the tip opening of the pipe 105 on the vehicle cabin unit 10 side. The connection member 210A is provided with a connection detection sensor 211A capable of detecting a connection state between the tip opening of the pipe 204 and the tip opening of the pipe 105. Similarly, the traveling unit 20 includes a connection member 210B that connects the tip opening of the pipe 206 and the tip opening of the pipe 117 on the vehicle cabin unit 10 side. The connection member 210B is provided with a connection detection sensor 211B capable of detecting the connection state between the tip opening of the pipe 206 and the tip opening of the pipe 117. The connection detection sensor 211A and the connection detection sensor 211B are exemplified to include a mechanical switch, an electric circuit for checking electrical conductivity, an optical waveguide for checking whether light arrives, and the like.

In the vehicle 1 as described above, when the valve 106 installed in the middle of the pipe 105 is closed, the supply of water from the clean water tank 103 to the traveling unit 20 side through the pipe 105 is suppressed. In such a case, the water is not supplied to the traveling unit 20 side. Therefore, it goes without saying that the water does not return to the vehicle cabin unit 10 side through the pipe 206 of the traveling unit 20. That is, the water stored in the clean water tank 103 is used solely on the vehicle cabin unit 10 side. More specifically, the water stored in the clean water tank 103 is pumped to the water heater 102 by the pump 118 and then heated by the water heater 102 to become the hot water. The hot water is used in the sink for a predetermined purpose and then stored in the wastewater tank 107. The warm water stored in the wastewater tank 107 is pumped to the air conditioner 108 by the pump 119 and used to generate the warm air.

Functional Configuration of Control Device 21

Figure 2:
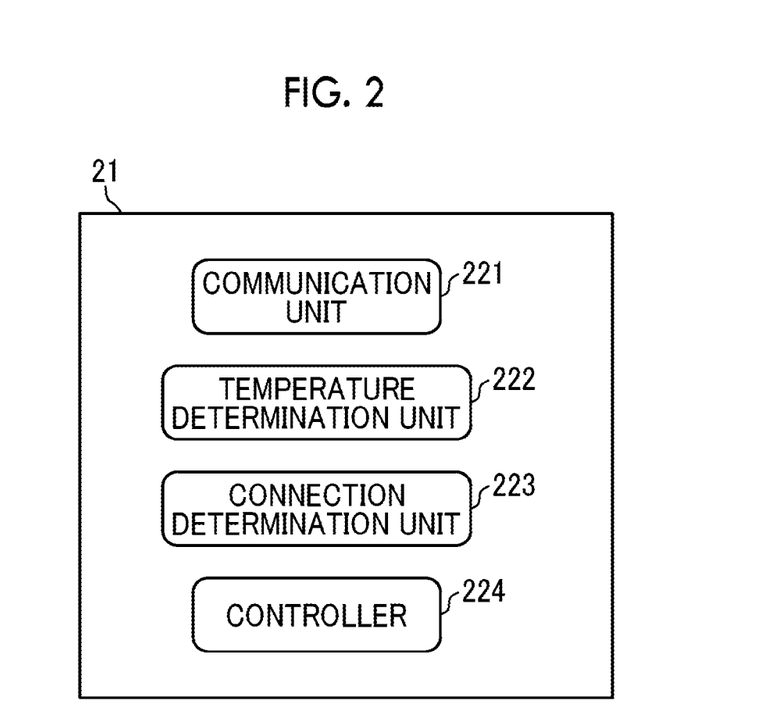
FIG. 2 shows an example of an outline of a functional configuration of a control device.

FIG. 2 shows an example of an outline of a functional configuration of the control device 21. Each function described below is realized by the CPU of the ECU executing a computer program developed in the memory in an executable manner.

The control device 21 includes a communication unit 221. The communication unit 221 is formed including a communication module. The communication unit 221 wirelessly communicates, according to a predetermined communication standard, with control targets including various sensors (including the temperature sensor 120, the temperature sensor 209, the connection detection sensor 211A, and the connection detection sensor 211B), the valve 106, and the pumps 118, 119, 217 which are disposed in the vehicle 1.

The control device 21 includes a temperature determination unit 222. The temperature determination unit 222 determines whether or not the temperature measured by the temperature sensor 209 installed near the drive motor 202 exceeds a determination reference. The determination reference is set to a value that does not affect the driving of the drive motor 202 due to the heat, for example, a value such that internal windings inside the drive motor 202 are not burned. The temperature determination unit 222 also determines whether or not the temperature measured by the temperature sensor 120 installed in the pipe 104 of the vehicle cabin unit 10 is lower than the above determination reference.

The control device 21 includes a connection determination unit 223. The connection determination unit 223 determines whether or not the vehicle cabin unit 10 and the traveling unit 20 are connected. More specifically, in a case where both signals of a signal, generated by the connection detection sensor 211A, indicating the connection state between the tip opening of the pipe 105 and the tip opening of the pipe 204 and a signal, generated by the connection detection sensor 211B, indicating the connection state between the tip opening of the pipe 117 and the tip opening of the pipe 206 indicate that the tip openings are connected, the connection determination unit 223 determines that the vehicle cabin unit 10 and the traveling unit 20 are connected.

The control device 21 includes a controller 224. The controller 224 generates the opening-degree control signal to control the opening degree of the valve 106 provided in the vehicle 1. The controller 224 also generates the opening-degree control signal to control the opening degree of the valves other than the valve 106 provided in the vehicle 1. The controller 224 generates an operation control signal to operate the pumps 118, 119, 217 provided in the vehicle 1. The controller 224 is an example of the "controller" in the present disclosure.

Processing Flow of Control Device 21

Figure 3:
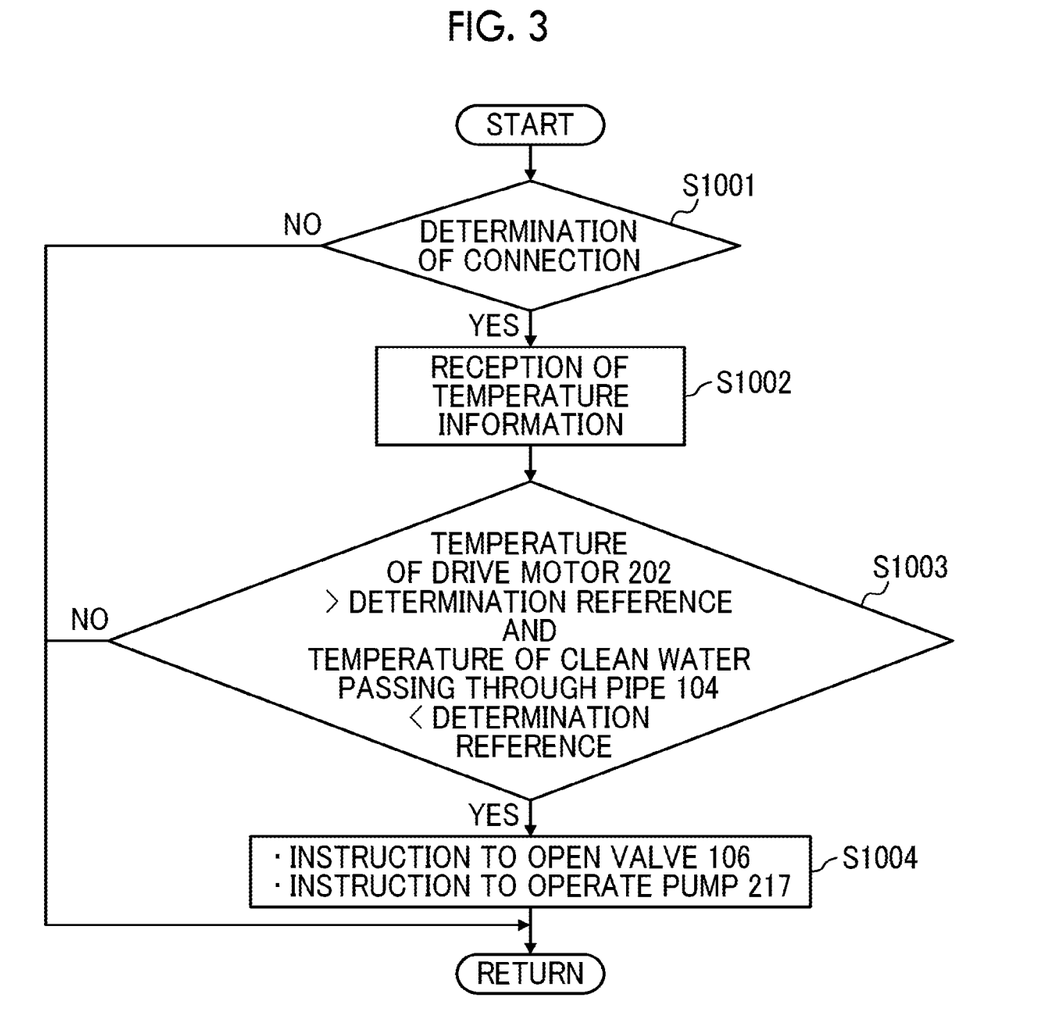
FIG. 3 shows an example of a flowchart of processing executed by the control device.

Next, a processing flow executed by the control device 21 will be described. FIG. 3 shows an example of a flowchart of processing executed by the control device 21. It is assumed that the pump 118 operates and that the clean water is supplied from the clean water tank 103 to the water heater 102. It is assumed that the pump 119 operates and the wastewater circulates between the wastewater tank 107 and the air conditioner 108. It is assumed that the connection detection sensor 211A and the connection detection sensor 211B periodically transmit signals indicating the connection state to the communication unit 221.

S1001

In step S1001, the connection determination unit 223 determines whether or not the vehicle cabin unit 10 and the traveling unit 20 are connected, using the signal, transmitted by the connection detection sensor 211A, indicating the connection state between the tip opening of the pipe 204 and the tip opening of the pipe 105 and the signal, transmitted by the connection detection sensor 211B, indicating the connection state between the tip opening of the pipe 206 and the tip opening of the pipe 117 (an example of a "determination step" in the present disclosure).

S1002

In step S1002, in a case where both signals of the signal indicating the connection state between the tip opening of the pipe 105 and the tip opening of the pipe 204 and the signal indicating the connection state between the tip opening of the pipe 117 and the tip opening of the pipe 206 indicate that the tip openings are connected and the vehicle cabin unit 10 and the traveling unit 20 are determined to be connected in step S1001, the communication unit 221 receives the temperature information near the drive motor 202 from the temperature sensor 209. The communication unit 221 receives the temperature information of the clean water passing through the pipe 104 from the temperature sensor 120.

S1003

In step S1003, the temperature determination unit 222 determines whether or not the temperature near the drive motor 202 received in step S1002 exceeds the determination reference. In a case where the temperature near the drive motor 202 is determined to exceed the determination reference, the temperature determination unit 222 further determines whether or not the temperature of the clean water passing through the pipe 104 measured by the temperature sensor 120 is lower than the determination reference. The determination reference to determine the temperature of the clean water passing through the pipe 104 may be the same as the determination reference to determine the temperature near the drive motor 202 or may be a numerical value lower than the determination reference.

S1004

In step S1004, in a case where the temperature near the drive motor 202 is determined to be higher than the determination reference and further the temperature of the clean water passing through the pipe 104 is lower than the determination reference in step S1003, the controller 224 generates an opening-degree control signal to issue an instruction to open the valve 106. The controller 224 generates the operation control signal to operate the pump 217. The communication unit 221 transmits the opening-degree control signal for the valve 106 and the operation control signal of the pump 217 generated by the controller 224 to the respective devices (an example of a "supply step" in the present disclosure).

Description of Water Flow

Next, a water flow in the vehicle 1 will be described. It is assumed that the vehicle 1 is in traveling and the vehicle cabin unit 10 and the traveling unit 20 are determined to be connected in step S1001. In step S1003, it is assumed that the temperature determination unit 222 determines that the temperature near the drive motor 202 received in step S1002 is higher than the determination reference and further the temperature of the clean water passing through the pipe 104 measured by the temperature sensor 120 is lower than the determination reference.

In the above case, the valve 106 is opened by the control device 21 executing the processing of step S1004. Therefore, at least a part of the clean water flowing from the clean water tank 103 toward the water heater 102 passes through the pipe 105 and flows into the pipe 204 provided in the traveling unit 20. The clean water that passes through the pipe 204 flows into the jacket 203. The water flowing into the jacket 203 absorbs the heat generated from the drive motor 202. The warm water that absorbs the heat flows out to the pipe 206. The pump 217 provided in the middle of the pipe 206 is operated by the operation control signal received from the control device 21. Therefore, the warm water flowing out from the jacket 203 to the pipe 206 flows into the pipe 117 provided in the vehicle cabin unit 10. The warm water that passes through the pipe 117 flows into the clean water tank 103.

That is, the clean water supplied from the clean water tank 103 to the water heater 102 is mixed with the warm water that has absorbed the heat generated from the drive motor 202. The mixed water is heated by the water heater 102 to generate the hot water.

The generated hot water is used in the sink for a predetermined purpose and stored in the wastewater tank 107. The warm water stored in the wastewater tank 107 is pumped to the air conditioner 108 by the pump 119 and used to generate the warm air. That is, the warm water used to generate the warm air in the air conditioner 108 is also mixed with the warm water that has absorbed the heat generated from the drive motor 202. The pump 118 and the valve 106 are examples of a "first controller" in the present disclosure. The pump 217 is an example of a "second controller" in the present disclosure.

Effect of First Embodiment

In a case of the electric vehicle, the heat generated from the drive motor 202 while the vehicle travels is a problem.

A cooling function corresponding to the heat generation may be generated. However, in a vehicle in which the traveling unit 20 and the vehicle cabin unit 10 are separable and connectable, provision of a sufficient heat dissipation mechanism for the traveling unit 20 may be difficult due to a dimensional limitation of the traveling unit 20. However, in the vehicle 1 as described above, a part of the water stored in the clean water tank 103 in the vehicle cabin unit 10 and flowing toward the water heater 102 is supplied to the jacket 203 that covers the drive motor 202 installed in the traveling unit 20. Therefore, with the vehicle 1 as described above, the traveling unit 20 is provided with a simple heat dissipation structure (jacket 203) and the water stored in the vehicle cabin unit 10 is used, and thus it is possible to accelerate the heat dissipation of the drive motor 202. The heat dissipation of the drive motor 202 is accelerated in this manner, but the traveling unit 20 is not provided with a device for heat dissipation. Therefore, the traveling unit 20 suppresses the increase in size.

With the vehicle 1 as described above, the warm water that passes through the jacket 203 and has absorbed the heat generated from the drive motor 202 flows into the clean water tank 103 and is mixed with the clean water originally stored in the clean water tank 103. The mixed water is heated by the water heater 102. That is, the heat generation of the drive motor 202 is used to save the energy for heating the water in the water heater 102.

The warm water heated in the water heater 102 is used for a predetermined purpose in the sink installed in the kitchen unit 101. The warm water is stored in the wastewater tank 107 and then circulates between the tank and the air conditioner 108. That is, the heat generation of the drive motor 202 is used to save the energy for generating the warm air in the air conditioner 108.

With the vehicle 1 as described above, heat storage is realized in the wastewater tank 107. Therefore, even when the drive motor 202 does not generate the heat, the warm water stored in the wastewater tank 107 is sent to the air conditioner 108 to save the energy for generating the warm air in the air conditioner 108.

Modification Example

In the above first embodiment, the opening degree of the valve 106 may be adjusted according to the values of the temperature of the drive motor 202 and the temperature of the clean water passing through the pipe 104. With such a control device 21, it is possible to adjust the flow rate of the clean water flowing into the jacket 203 of the traveling unit 20 from the vehicle cabin unit 10 side according to the values of the temperature of the drive motor 202 and the temperature of the clean water passing through the pipe 104. The water flowing from the vehicle cabin unit 10 side to the traveling unit 20 side may be executed regardless of the value of the temperature measured by the temperature sensor 209 installed in the drive motor 202.

The vehicle cabin unit 10 may have a structure in which at least a part of the warm air generated in the air conditioner 108 is supplied to the inside of the wastewater tank 107. With such a vehicle cabin unit 10, at least a part of the wastewater stored in the wastewater tank 107 is evaporated by the warm air. Therefore, an amount of the wastewater discharged from the valve 111 is reduced and the wastewater is easily handled.

The vehicle cabin unit 10 may have a structure in which the warm water that passes through the jacket 203 is not returned to the vehicle cabin unit 10 side. The vehicle cabin unit 10 may have a structure in which a refrigerant used in the air conditioner 108 provided in the vehicle cabin unit 10 flows into the jacket 203 of the traveling unit 20.

Second Embodiment

Configuration of Vehicle Cabin Unit 10A

Figure 4:
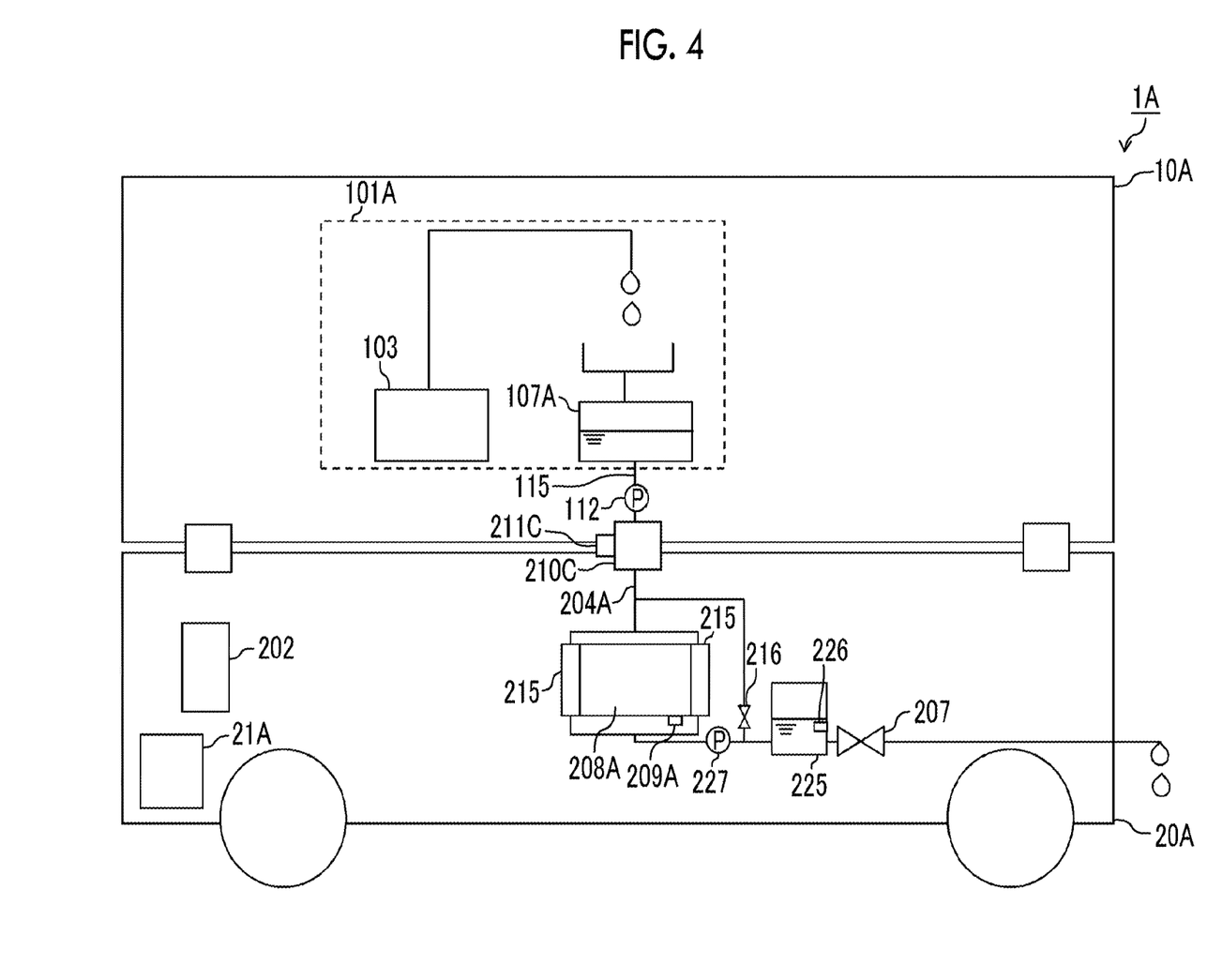
FIG. 4 shows an example of an outline of a vehicle structure according to a second embodiment.

FIG. 4 shows an example of an outline of a structure of a vehicle 1A according to a second embodiment. A vehicle cabin unit 10A of the vehicle 1A according to the second embodiment includes a kitchen unit 101A. The kitchen unit 101A is provided with the clean water tank 103 as in the first embodiment. The clean water stored in the clean water tank 103 is used for a predetermined purpose and becomes the wastewater. The kitchen unit 101A is provided with a wastewater tank 107A that stores the wastewater. A pipe 115 for discharging the wastewater is connected to the wastewater tank 107A. The pipe 115 is provided such that a tip opening of the pipe is connectable with a pipe provided in a traveling unit 20A. A pump 112 is provided in the middle of the pipe 115. The operation of the pump 112 is controlled to adjust the flow rate of the wastewater discharged from the wastewater tank 107A. The pipe 115 is an example of the "first path" in the present disclosure.

Configuration of Traveling Unit 20A

The traveling unit 20A has the same component as the traveling unit 20 according to the first embodiment. In addition, the traveling unit 20A includes a temperature sensor 209A, near a battery 208A, that measures the temperature near the battery 208A. The traveling unit 20A is provided with a cooling plate 215 so as to be in contact with a surface of the battery 208A. A flow pipe that allows the water to pass through is laid so as to meander along a plate plane inside the cooling plate 215. That is, the water flowing through the flow pipe can exchange heat with the surface of the battery 208A through the cooling plate 215.

The traveling unit 20A includes a pipe 204A that is connected to a flow pipe inlet of the cooling plate 215 and causes the water to flow into the flow pipe. The pipe 204A is provided such that a tip opening of the pipe is connectable with the tip opening of the pipe 115 provided in the vehicle cabin unit 10A. The traveling unit 20A is provided with a wastewater tank 225 that stores the wastewater that passes through the flow pipe of the cooling plate 215 and a pump 227 that pumps the wastewater from the flow pipe of the cooling plate 215 to the wastewater tank 225.

In the wastewater tank 225, decomposition treatment using a microorganism is performed on a contaminant contained in the wastewater. A temperature sensor 226 capable of measuring the temperature of the stored wastewater is installed inside the wastewater tank 225. The traveling unit 20 is provided with a pipe that connects the flow pipe of the cooling plate 215 and the wastewater tank 225, and a branch pipe that branches from the pipe and joins the pipe 204A. A valve 216 is provided in the branch pipe. The opening degree of the valve 216 is controlled to adjust the flow rate of the wastewater that joins the pipe 204A and flows into the flow pipe inlet of the cooling plate 215 again out of the wastewater flowing from a flow pipe outlet of the cooling plate 215 toward the wastewater tank 225.

The traveling unit 20A includes a discharge pipe that is connected to the wastewater tank 225 and that allows the wastewater to discharge from the wastewater tank 225 to the outside of the system. A valve 207 is provided in the middle of the discharge pipe. The opening degree of the valve 207 is controlled to adjust the flow rate of the wastewater discharged from the wastewater tank 225 to the outside of the system is adjusted.

The traveling unit 20A includes a connection member 210C that connects the tip opening of the pipe 204A and the tip opening of the pipe 115 on the vehicle cabin unit 10A side. The connection member 210C includes a connection detection sensor 211C capable of detecting the connection state between the tip opening of the pipe 204A and the tip opening of the pipe 115 on the vehicle cabin unit 10A side.

Processing Flow of Control Device 21A

Figure 5:
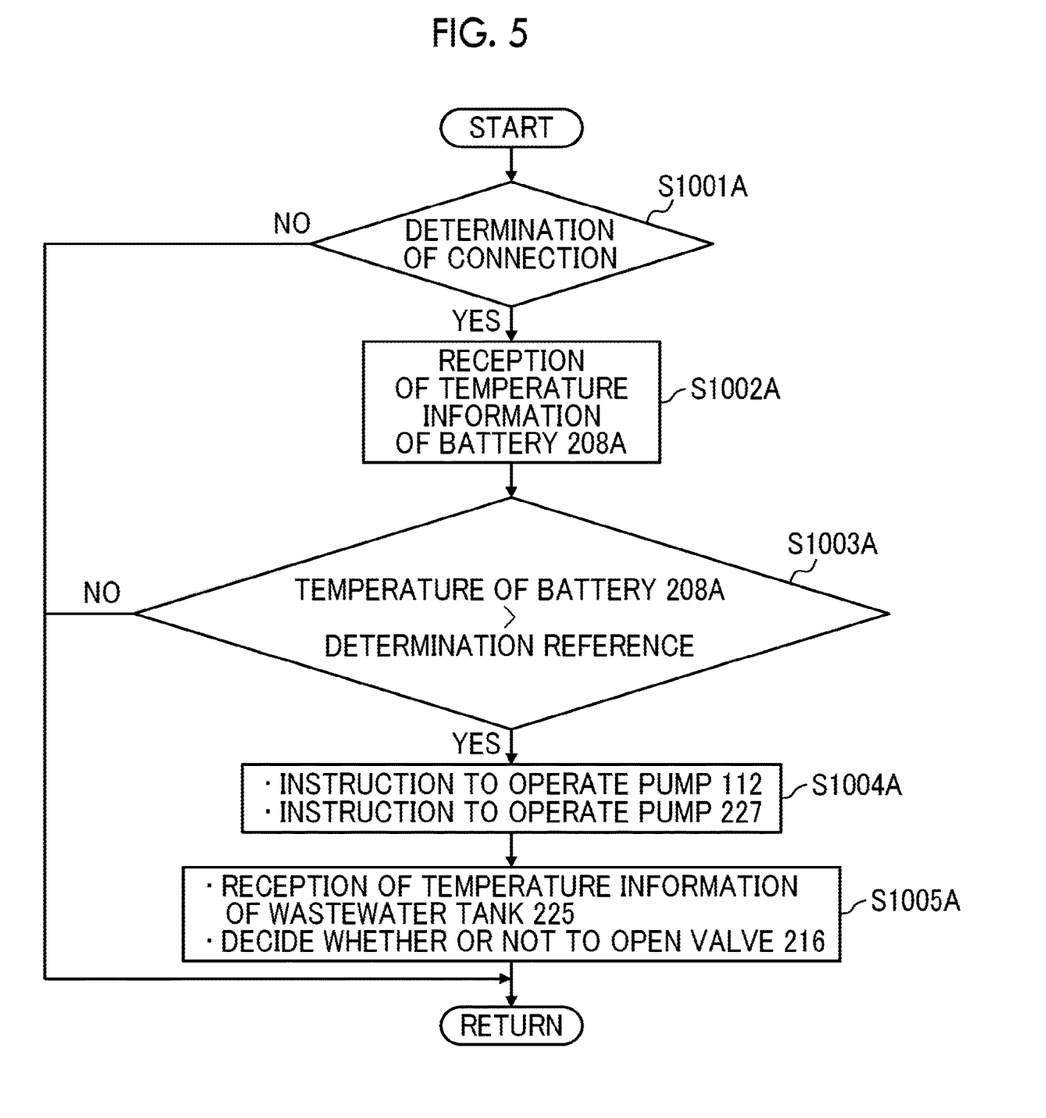
FIG. 5 shows an example of a flowchart of processing executed by a control device according to the second embodiment.

Next, a processing flow executed by the control device 21A will be described. FIG. 5 shows an example of a flowchart of processing executed by the control device 21A. It is assumed that the pumps 112, 227 are initially not operated and valve 216 is initially closed. Details of the processing executed in each step will be exemplified below.

S1001A

In step S1001A, a connection determination unit 223A determines whether or not the vehicle cabin unit 10A and the traveling unit 20A are connected, using a signal, transmitted by the connection detection sensor 211C, indicating the connection state between the tip opening of the pipe 115 and the tip opening of the pipe 204A (an example of the "determination step" in the present disclosure).

S1002A

In step S1002A, in a case where the signal indicating the connection state between the tip opening of the pipe 115 and the tip opening of the pipe 204A indicates that the tip openings are connected and the vehicle cabin unit 10A and the traveling unit 20A are determined to be connected in step S1001A, a communication unit 221A receives the temperature information near the battery 208A from the temperature sensor 209A.

S1003A

In step S1003A, determination is made whether or not the temperature near the battery 208A received in step S1002A is higher than a determination reference. The determination reference is a value that does not affect the battery 208A due to the heat. For example, in a case where a threshold value of temperature at which a failure rate of the battery 208A rapidly increases is known, the temperature is set as the determination reference.

S1004A

In step S1004A, in a case where the temperature near the battery 208A is determined to be higher than the determination reference in step S1003A, a controller 224A generates an operation control signal to issue an instruction to operate the pump 112. The communication unit 221A transmits the generated operation control signal to the pump 112. The controller 224A generates an operation control signal to issue an instruction to operate the pump 227. The generated operation control signal is transmitted to the pump 227 by the communication unit 221A. The pump 112 is an example of the "first controller" in the present disclosure. Step S1004A is an example of the "supply step" in the present disclosure.

S1005A

In step S1005A, the communication unit 221A receives the temperature information of the wastewater stored in the wastewater tank 225 from the temperature sensor 226. In a case where the temperature in the wastewater tank 225 received from the temperature sensor 226 is lower than the temperature near the battery 208A received from the temperature sensor 209A in step S1002A, the controller 224A generates an opening-degree control signal to issue an instruction to open the valve 216. The generated opening-degree control signal is transmitted to the valve 216 by the communication unit 221A. The opening-degree control signal to open the valve 216 may be generated in a case where the temperature of the wastewater stored in the wastewater tank 225 received from the temperature sensor 226 is lower than the temperature near the battery 208A by a predetermined value or more. The opening-degree control signal to open the valve 216 may be generated in a case where the temperature of the wastewater stored in the wastewater tank 225 is lower than the temperature near the battery 208A and lower than a temperature at which a decomposition reaction using the microorganism rapidly proceeds.

Description of Wastewater Flow

Next, a flow of the wastewater will be described. It is assumed that the vehicle 1A is stopped, the battery 208A is supplied with the electric power from an external power supply device, and the battery 208A is being charged. In step S1003A, it is assumed that a temperature determination unit 222A determines that the temperature near the battery 208A received in step S1002A is higher than the determination reference.

In such a case, the control device 21A executes the processing of step S1004A to operate the pump 112. Therefore, the wastewater stored in the wastewater tank 107A passes through the pipe 115 and is pumped to the pipe 204A provided in the traveling unit 20A. The wastewater that passes through the pipe 204A flows into the flow pipe of the cooling plate 215. The wastewater flowing into the flow pipe of the cooling plate 215 absorbs the heat generated from the battery 208A disposed so as to be in contact with the cooling plate 215 through the cooling plate 215. The wastewater that has absorbed the heat is pumped to the wastewater tank 225 by the pump 227.

In the wastewater tank 225, the decomposition treatment using the microorganism is performed on the contaminant contained in the wastewater. The wastewater stored in the wastewater tank 225 absorbs the heat generated from the battery 208A being charged. Therefore, the decomposition treatment may be accelerated. In a case where the temperature in the wastewater tank 225 is lower than the temperature near the battery 208A, the valve 216 is opened and a part of the wastewater that has absorbed the heat generated from the battery 208A flows into the flow pipe of the cooling plate 215 of the battery 208A again. Therefore, the temperature of the wastewater flowing out from the flow pipe of the cooling plate 215 rises. Therefore, the temperature of the wastewater flowing into the wastewater tank 225 rises. Therefore, the decomposition treatment in the wastewater tank 225 may be accelerated. Since the wastewater stored in the wastewater tank 225 absorbs the heat generated from the battery 208A being charged, a part thereof may be dried. Such wastewater stored in the wastewater tank 225 is discharged to the outside of the system in a case where the valve 207 is open.

As in the first embodiment, a pipe may be installed that allows the wastewater heated by absorbing the heat in the flow pipe of the cooling plate 215 to return to the wastewater tank 107A on the vehicle cabin unit 10A side. A valve may be provided in the middle of the pipe, and the opening degree of the valve may be controlled to adjust the flow rate of the wastewater returning to the vehicle cabin unit 10A side.

Effect of Second Embodiment

In a case of the electric vehicle, the battery 208A may generate heat when the battery 208A mounted therein is rapidly charged. A cooling function corresponding to the heat generation may be provided. However, in the vehicle 1A in which the traveling unit 20A and the vehicle cabin unit 10A are separable and connectable, provision of a sufficient heat dissipation mechanism for the traveling unit 20A may be difficult due to a dimensional limitation of the traveling unit 20A. However, in the vehicle 1A as described above, the water stored in the wastewater tank 107A in the vehicle cabin unit 10A is supplied to the flow pipe of the cooling plate 215 provided so as to be in contact with the battery 208A installed in the traveling unit 20A. Therefore, with the vehicle 1A as described above, the traveling unit 20A is provided with a simple heat dissipation structure (cooling plate 215) and the water stored in the wastewater tank 107A of the vehicle cabin unit 10A is used, and thus it is possible to accelerate the heat dissipation of the battery 208A during charging. The heat dissipation of the battery 208A during charging is accelerated, but the traveling unit 20A is not provided with a device for heat dissipation. Therefore, the traveling unit 20A suppresses the increase in size.

In the vehicle 1A as described above, the contaminant contained in the wastewater is decomposed by the microorganism. Therefore, the wastewater is easily handled in a case where the wastewater is discharged from the vehicle 1A or the like. The wastewater stored in the wastewater tank 225 absorbs the heat generated from the battery 208A, and the contaminant is decomposed in a state where the temperature of the water is higher than that in the case where the water is stored in the wastewater tank 107A. Therefore, the decomposition reaction may be accelerated. As shown in step S1005A, in a case where the temperature in the wastewater tank 225 is lower than the temperature near the battery 208A, the valve 216 is opened and the wastewater that has absorbed the heat generated from the battery 208A flows into the flow pipe of the cooling plate 215 again to absorb the heat generated from the battery 208A. Therefore, the temperature of the wastewater flowing into the wastewater tank 225 rises, and the decomposition reaction of the contaminant contained in the wastewater is accelerated.

Since the wastewater stored in the wastewater tank 225 absorbs the heat generated from the battery 208A, at least a part of the wastewater may be dried. Therefore, an amount of the wastewater stored in the wastewater tank 107A may be reduced and discharged. From this point of view, the vehicle 1A may be a vehicle in which the wastewater is easily handled.

The heat generated by the driving of the drive motor 202 while the vehicle travels may be absorbed by the wastewater stored in the wastewater tank 107A. With such a structure, it is possible to accelerate the heat dissipation of the drive motor 202.

The above embodiments are merely examples, and the present disclosure may be modified and implemented as appropriate within a scope not departing from the gist thereof.

The configurations and processing described in the present disclosure can be freely combined and implemented as long as no technical contradiction occurs.

The processing described as being performed by one device may be shared and executed by a plurality of devices. Alternatively, the processing described as being performed by different devices may be executed by one device. In a computer system, it is possible to flexibly change the hardware configuration (server configuration) for realizing each function.

The present disclosure can also be realized by supplying a computer with a computer program that implements the functions described in the above embodiments, and one or more processors included in the computer read and execute the program. Such a computer program may be provided to the computer by a non-transitory computer readable storage medium connectable to a system bus of the computer, or may be provided to the computer through a network. Examples of the non-transitory computer-readable storage medium include any type of disc such as a magnetic disc (floppy (registered trademark) disc, hard disk drive (HDD), or the like) and an optical disc (CD-ROM, DVD disc, Blu-ray disc, or the like), a read solely memory (ROM), a random access memory (RAM), an EPROM, an EEPROM, a magnetic card, a flash memory, an optical card, and any type of medium suitable for storing an electronic command.

What is claimed is:

1. A non-transitory computer-readable storage medium storing instructions which, when executed by at least one processor, cause the at least one processor to perform operations comprising:

determining a connection between a first unit that has a boarding space which allows a user to board and is provided with a predetermined facility and that is provided with a first path through which a fluid used in the predetermined facility passes and a second unit that includes a second path and is configured to be separated from and connected to the first unit and that has a drive device of a vehicle that is formed by being connected to the first unit by a connection member that connects a tip opening of the first path and a tip opening of the second path, wherein the connection member includes a connection detection sensor that detects a connection state between the tip opening of the first path and the tip opening of the second path and determining that the connection is based on a signal indicating the connection state transmitted by the connection detection sensor, and supplying the fluid in the first path to a second unit side to absorb heat generated from the drive device.

2. The non-transitory computer-readable storage medium according to claim 1, wherein the processor further executes adjusting a supply amount of the fluid supplied from the first path to the second unit side based on a temperature of the drive device.

3. The non-transitory computer-readable storage medium according to claim 1, wherein the processor further executes recovering the fluid that has absorbed the heat generated from the drive device to a first unit side.

4. The non-transitory computer-readable storage medium according to claim 3, wherein:

the fluid includes water;

the predetermined facility includes a water heater; and the processor executes recovering water that has absorbed the heat generated from the drive device for the first path that supplies the water to the water heater.

5. The non-transitory computer-readable storage medium according to claim 3, wherein:

the predetermined facility includes an air conditioner; and the processor executes recovering the fluid that has absorbed the heat generated from the drive device for the first path through which a heating medium that exchanges heat with air supplied from the air conditioner passes.

6. The non-transitory computer-readable storage medium according to claim 3, wherein:

the fluid includes water; and the processor executes recovering water that has absorbed the heat generated from the drive device such that heat exchange with wastewater after being used in the predetermined facility is possible.

7. The non-transitory computer-readable storage medium according to claim 1, wherein the drive device includes a motor that drives drive wheels of the vehicle.

8. The non-transitory computer-readable storage medium according to claim 7, wherein the processor executes supplying a part of the fluid to the second unit side when the motor exceeds a predetermined temperature and a temperature of the fluid in the first flow path is lower than the predetermined temperature.

9. The no-transitory computer-readable storage medium according to claim 1, wherein the drive device includes a secondary battery that supplies electric power to a motor that drives drive wheels of the vehicle.

10. The non-transitory computer-readable storage medium according to claim 9, wherein the processor executes supplying the fluid in the first path to the second unit side when the secondary battery is charged.

* * * * *